United States Patent [19]
Manigault

[11] 3,862,845
[45] Jan. 28, 1975

[54] ALUMINA REFRACTORIES HAVING A PERMANENT EXPANSION UPON HEATING
[75] Inventor: Edward L. Manigault, Cincinnati, Ohio
[73] Assignee: The Chas. Taylor's Sons Company, Cincinnati, Ohio
[22] Filed: Feb. 25, 1974
[21] Appl. No.: 445,647

[52] U.S. Cl................ 106/59, 106/62, 106/65, 106/66, 106/73.4
[51] Int. Cl. .................. C04b 35/10, C04b 35/12
[58] Field of Search ......... 106/59, 62, 65, 66, 73.4

[56] References Cited
UNITED STATES PATENTS
2,218,584  10/1940  McDougal et al. ............... 106/66
3,238,049  3/1966  Somers ............................. 106/73.4
3,615,775  10/1971  Teeter ................................ 106/66

Primary Examiner—J. Poer

[57] ABSTRACT

A new alumina-chromic oxide refractory composition having a permanent expansion upon heating has been prepared. It has the following composition:

| | % |
|---|---|
| Alumina | 72–98 |
| Chromic Oxide | 1–25 |
| Magnesium Oxide | 0.1–0.5 |
| $P_2O_5$ | 0.5–4.0 |

4 Claims, No Drawings

ALUMINA REFRACTORIES HAVING A PERMANENT EXPANSION UPON HEATING

BACKGROUND OF THE INVENTION

Alumina-chromic oxide refractory products, such as bricks and the like, have been prepared by the prior art. These refractory products have been bonded by many agents including a solution of either mono-aluminum phosphate or 80 percent phosphoric acid. Although these products possess good linear and volume stability, it would be desirable to produce products having a permanent expansion upon heating.

This permanent expansion property is particularly desirable when this type of product is used in structural applications such as lining for a coreless induction furnace. In such an application, it is desired that the lining have a permanent expansion so that any cracks which form do not open to permit the molten metal to penetrate the furnace lining.

SUMMARY OF THE INVENTION

A new alumina chromic oxide refractory has been prepared which has a permanent expansion upon heating. This composition is described as follows:

| INGREDIENTS | % |
|---|---|
| Alumina | 72–98 |
| Chromic Oxide | 1–25 |
| Magnesium Oxide | 0.1–0.5 |
| $P_2O_5$ | 0.5–4.0 |

The magnesium oxide and the $P_2O_5$ are employed as a magnesium phosphate solution containing 3 percent to 7 percent MgO and from 35 percent to 55 percent phosphoric acid, the remainder being water.

The magnesium phosphate solution is added to the alumina and the chromic oxide ingredients to produce the following mixture:

|  | % |
|---|---|
| Alumina | 72–98 |
| Chromic Oxide | 1–25 |
| Magnesium Phosphate Solution | 4–7 |

DESCRIPTION OF THE PREFERRED EMBODIMENTS

The mixture described above is then either packaged as a ceramic composition in an unformed state commonly referred to as a "specialty" product, i.e., a product to be formed by the customer, or formed into shapes such as bricks and the like which are fired by the manufacturer.

The fired refractory product possesses a permanent expansion which is more desirable than the linear characteristics obtained when either phosphoric acid or mono-aluminum phosphate is used as the source of phosphate in the alumina-chromic oxide mixture. In addition the modulus of rupture is also increased.

The alumina used in the instant invention should be 99+percent alumina and may be either tabular or a mixture of tabular and calcined alumina. The alumina should be present in a variety of sizes ranging from −4 mesh to −325 mesh. When calcined $Al_2O_3$ is used, it is added as −325 mesh.

In order to describe the instant invention in more detail, the following example is presented:

A composition containing the following ingredients was employed:

| Tabular Alumina | −4+14 mesh, Kg. | 29.8 |
|---|---|---|
| Tabular Alumina | −14+60 mesh, Kg. | 21.6 |
| Tabular Alumina | −60+325 mesh, Kg. | 14.8 |
| Tabular Alumina | −325 mesh, Kg. | 19.1 |
| Calcined Alumina | −325 mesh, Kg. | 4.7 |
| Chromic Oxide | −325 mesh, Kg. | 10.0 |
| Magnesium Phosphate Solution |  | 5.4 |

The mixture was then formed into bricks 9 inches × 4½inches × 3 inches and the bricks were fired at 2,850°F for 5 hours.

The fired bricks had the following properties:

| Fired Linear Change, % | +0.19 |
|---|---|
| Modulus of Rupture, psi | 8488 |
| Porosity % | 10.9 |
| Absorption, % | 3.3 |
| Bulk Density, Gm./cc. | 3.34 |
| Buld Density, lb./cu.ft. | 209 |

Two control runs identified as Runs A and B were prepared which employed 5.5 Kg. of 80 percent solution of phosphoric acid in Run A instead of 5.4 Kg. of magnesium phosphate solution used in the example while 4.7 Kg. of mono-aluminum phosphate were used in Run B. All of the other ingredients were the same as those used in the example. The resultant properties of the example and the control Runs A and B are presented in the table to show a direct comparison with the example.

From the above description and by the examples presented, it has clearly been shown that a permanent expansion is obtained when magnesium phosphate is added to the alumina-chromic oxide refractory material.

While this invention has been described and illustrated by the examples shown, it is not intended to be strictly limited thereto, and other variations and modifications may be employed within the scope of the following claims.

TABLE

| PROPERTIES | EXAMPLE | CONTROL RUN A | CONTROL RUN B |
|---|---|---|---|
| Fired Linear Change,% | +0.19 | 0.08 | −0.08 |
| Modulus of Rupture, psi | 8488 | 7013 | 7347 |

What is claimed is:

1. A refractory composition of matter having a permanent expansion upon heating comprising from 72 percent to 98 percent alumina, from 1 percent ot 25 percent chromic oxide, from 0.1 percent to 0.5 percent MgO and from 0.5 percent to 4.0 percent $P_2O_5$.

2. Method for preparation of refractory composition having a permanent expansion upon heating which comprises admixing from 72 percent to 98 percent alumina, from 1 percent to 25 percent chromic oxide and 4 percent to 7 percent of a magnesium phosphate solution containing from 3 percent to 7 percent MgO and from 35 percent to 55 percent phosphoric acid, forming said mixture into bricks and firing said bricks to produce said refractory composition.

3. Method according to claim 2 in which the alumina employed is 99+ percent alumina.

4. Method of forming a ceramic composition in an unformed state which comprises admixing from 72 percent to 98 percent alumina, from 1 percent to 25 percent chromic oxide and from 4 percent to 7 percent of a magnesium phosphate solution containing from 3 percent to 7 percent MgO and from 35 percent to 55 percent phosphoric acid.

* * * * *